United States Patent [19]

Michael

[11] Patent Number: 4,460,422
[45] Date of Patent: Jul. 17, 1984

[54] FILAMENT WINDINGS METHOD AND APPARATUS EMPLOYING A TROWEL

[75] Inventor: Vesta F. Michael, San Antonio, Tex.

[73] Assignee: Fiber Glass Systems Inc., San Antonio, Tex.

[21] Appl. No.: 405,792

[22] Filed: Aug. 6, 1982

[51] Int. Cl.³ ........................................... B65H 81/00
[52] U.S. Cl. .................................. 156/175; 118/107; 118/120; 118/DIG. 11; 156/425; 427/355; 427/369
[58] Field of Search .............. 156/169, 172, 173, 175, 156/425, 428, 429, 195, 187; 118/106, 107, 108, 109, 120, DIG. 11; 427/355, 177, 369, 356, 358

[56] References Cited

U.S. PATENT DOCUMENTS

| | | | |
|---|---|---|---|
| 2,193,971 | 3/1940 | Laurent | 118/108 |
| 3,025,205 | 3/1962 | Young | 156/169 |
| 3,231,442 | 1/1966 | Michael | 156/425 |
| 3,378,427 | 4/1968 | McClean | 156/431 |
| 3,492,187 | 1/1970 | Hirtzer | 156/429 |
| 3,518,916 | 7/1970 | Minnich et al. | 156/172 |
| 3,616,063 | 10/1971 | Bradley | 156/425 |
| 3,897,869 | 8/1975 | Michael | 156/433 |
| 4,063,838 | 12/1977 | Michael | 156/161 |
| 4,138,285 | 1/1979 | Michael | 156/161 |
| 4,174,243 | 11/1979 | Margarian | 156/175 |
| 4,253,894 | 3/1981 | Margarian | 156/175 |

Primary Examiner—Michael W. Ball
Attorney, Agent, or Firm—Neuman, Williams, Anderson & Olson

[57] ABSTRACT

A trowel for use in troweling a fluid resin-hardener mixture into the interstices of reinforcing filaments disposed about a rotating pipe-forming mandrel is provided. The trowel is semicircular in cross-section and is biased upwardly against the rotating mandrel as it moves along the length thereof. The trowel has substantially universal movement enabling it to maintain constant contact with the rotating pipe periphery.

11 Claims, 8 Drawing Figures

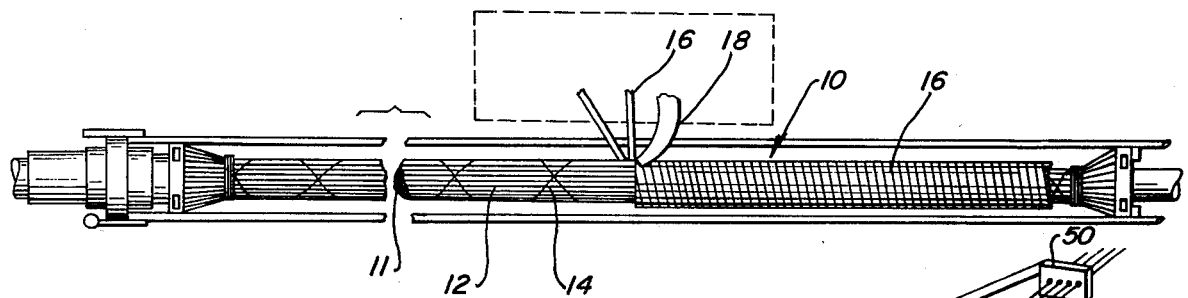
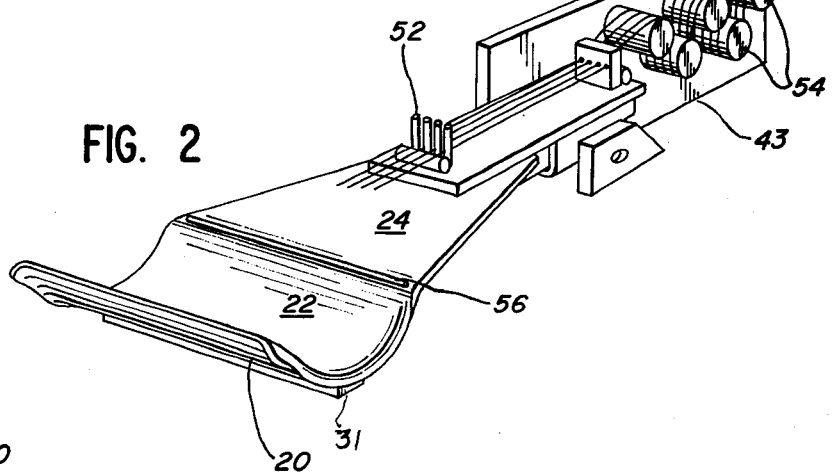
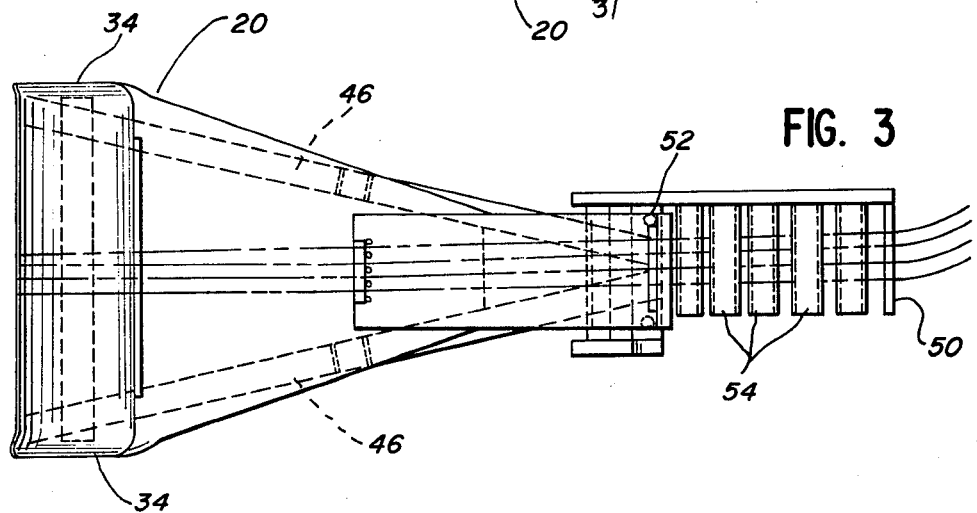
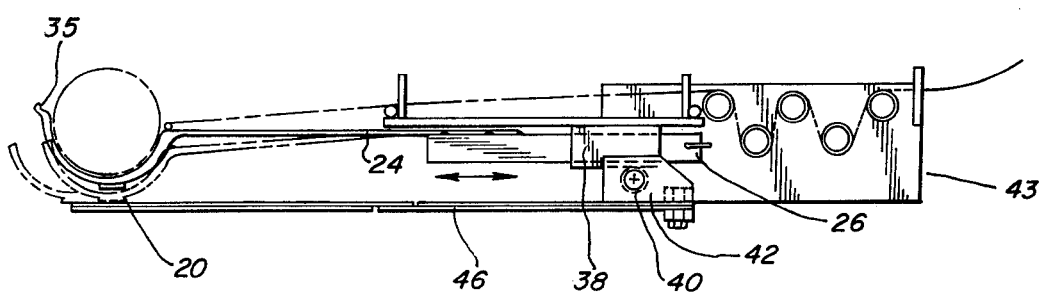

FILAMENT WINDINGS METHOD AND APPARATUS EMPLOYING A TROWEL

This invention relates to the manufacture of filament-reinforced resin bodies, and more particularly pertains to a trowel member employed in smoothing uncured resin into the interstices of a partially formed filament-reinforced body.

The manufacture of filament-reinforced resin bodies is known in the art. Thus, in my various earlier patents filament-reinforced resin pipe, rods and fittings are disclosed, together with methods of manufacturing the same. An extremely satisfactory pipe and fitting composition comprises untwisted glass filaments arranged transversely and longitudinally of the length of the member formed, embedded in a cured matrix of epoxy resin. The glass filaments provided exceptional tensile strength and the epoxy resin provides exceptional overall body strength. An epoxy resin composition found to provide excellent strength and wear characteristics comprises the thermosetting formula of 100 parts epoxy resin and 12 parts by volume of the hardener triethylene tetramine. Ethylene oxide and diethylene tetramine may also serve as hardeners for epoxy resins.

Most desirably the resin applied to filamentous reinforcements such as glass roving disposed about a rotatable form should wet all filaments and fill all filament interstices so as to insure the complete absence of any voids or dry spots within the completed filament reinforced resin body. Such "dry spots" comprise zones of weakness or focal points whereat failure is initiated when stress is applied. Proper troweling of the resin-hardener composition into the filament interstices assures the absence of dry spots, and in addition maintains resin wastage at a minimum by preventing dripping of resin from the partially formed pipe or the like.

Because of the limited working life of uncured resin-hardener compositions of the type given above, recovery for reuse purposes is minimized. Accordingly, it is a manufacturing desideratum to maintain dripping of the resin composition from the partially formed pipe or the like at a minimum. The resin component comprises a significant cost factor in the manufacture of the body of which comprising a part. Maintaining wastage thereof at an absolute minimum is accordingly a foremost manufacturing object.

A prior art method and apparatus for wiping resin from filament wound pipe is disclosed in Magarian U.S. Pat. No. 4,174,243. This patent discloses the use of parallel strands of nylon fishing line arranged parallel to the filaments of helically wound, resin-saturated, fibrous rovings. The parallel relationship is deemed necessary to prevent damage to the resin-saturated roving. Such an arrangement does not lend itself to engagement with filamentous reinforcements arranged parallel to the mandrel longitudinal axis such as are employed in the pipe structures and the like hereinafter described. The patented system also incorporates a method of saturating the filaments with resin prior to engaging a forming mandrel thereby enhancing the chances for resin loss prior to disposition about the pipe-forming mandrel. The wiper of this prior art patent is intended to remove excess resin. The trowel of the invention hereinafter described is adapted to smooth dispensed resin into the interstices of reinforcing filaments.

Methods of fiber delivery such as that disclosed in Young U.S. Pat. No. 3,025,205 are designed to apply desired resin quantities to the filaments applied to a rotatable mandrel. However, there is no disclosure of desired troweling action for forming a desired void-free end product.

It is an object of this invention to provide a trowel particularly adapted for efficiently smoothing liquid, uncured resin compositions into the interstices of filamentous reinforcements rotating about a form such as a mandrel or the like.

It is another object of this invention to provide trowel constructions which may be readily formed for custom use in the formation of pipe of specific diameter.

It is yet another object of this invention to provide a trowel construction designed to maintain constant desired contact with a rotating mandrel during rotational movement thereof despite mandrel movement or "wobble" from a constant longitudinal axis of revolution.

It is another object of this construction to provide a novel resin trowel construction designed to maintain resin wastage at an absolute minimum while assuring a desired finished appearance on the outer peripheries of the filament-reinforced members formed. A method for employing such trowel is also disclosed in the following description.

The above and other objects of this invention will become more apparent from the following description when read in the light of the accompanying drawing and appended claims.

In one embodiment of the provided invention a trowel is provided comprising one-half of a diametrically cut pipe. The elongate trough-like member of semi-circular cross-section is sized so as to be formed from a cylinder having an inner diameter approximately one inch larger than the outer diameter of a fiber-reinforced resin pipe member to be formed. The trowel is adapted to supportingly receive the mandrel and partially-completed pipe formed hereabout in the course of formation of the filament-reinforced resin pipe.

During pipe formation longitudinal and helical filament layers are wound about the periphery of a rotating mandrel. The filaments are applied along the length of the rotating mandrel until a pipe of desired dimensions has been formed. The provided trowel is resiliently mounted so as follow move or "give" with the engaged peripheral portion of the rotating mandrel and the pipe partially formed thereabout while maintaining a close, troweling engagement therewith, as dispensed resin is troweled onto the filaments disposed about the outer periphery of the rotating mandrel. The trowel is moved along the filamentious reinforcements as the helical reinforcements are applied to the mandrel. The trowel has depending lips at the opposed longitudinal end edges so as to trowel the uncured liquid resin onto the periphery of the pipe being formed as will hereinafter be explained in greater detail.

For a more complete understanding of this invention reference will now be made to the drawing wherein:

FIG. 1 is a schematic, fragmentary elevational view illustrating a partially formed, filament-reinforced epoxy resin pipe of the type made in accordance with the teachings of this invention;

FIG. 2 is a perspective view of a resin trowel member extending from a recpirocally movable carriage fragmentarily illustrated and adapted to feed reinforcing filaments to the pipe of FIG. 1 in the course of formation thereof;

FIG. 3 is a top plan view of the assembly of FIG. 2;

FIG. 4 is a side elevation view of the assembly of FIG. 3;

Figure 5:
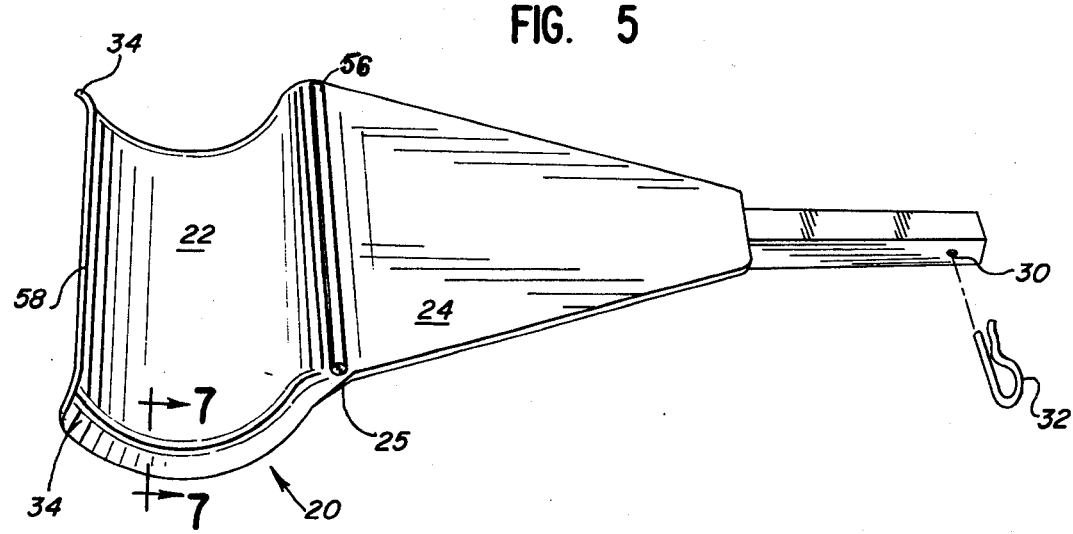
FIG. 5 is a perspective view of the trowel of the assemblies of FIGS. 2 through 4 showing the upper surface thereof.

Referring now more particularly to FIG. 1, a glass-reinforced resin pipe of the general type disclosed in earlier U.S. Pat. Nos. 3,231,442 of Jan 22, 1966 and 3,381,716 of May 7, 1968 is disclosed in an intermediate stage of formation. In the formation of the pipe 10 of FIG. 1 longitudinal assemblages 12 of glass fiber filaments comprising untwisted glass roving strands are positioned about the periphery of a rotating mandrel 11 disposed on a lathe-type machine. The mandrel or pipe form 11 determining the inner diameter of the type to be formed has a parting agent such as a wax coating disposed about the outer peripheral surface thereof to facilitate pipe-mandrel separation following pipe formation. The longitudinal strands 12 are tied down along the length by spiral wraps 14 whereafter such strands 12 and 14 are saturated with a hardenable resin composition such as an epoxy resin and hardener. Following resin saturation of the longitudinal strands 14, spiral wraps of glass roving such as illustrated spiral wrap 16 are applied to the rotating mandrel in overlying relationship with the longitudinal strands 14. The spiral strands 16 are also saturated as by a resin-hardener composition which may be discharged on the various filaments from a spout 18 fragmentarily illustrated and disposed in proximity to the point of filament application to rotating mandrel 11 and the overlying filaments.

Alternate layers of longitudinal and spiral filaments are applied until a desired pipe thickness is obtained. The resulting pipe product has excellent strength as the tensile strength of the glass filaments may be as high as a quarter of a million to four hundred thousand psi. Such filament-reinforced resin pipe is thus able to provide tremendous tensile strength such as is needed in down hole tubing in oil fields, and also possesses chemical resistance and corrosion resistance by virtue of the inert nature of the two principal components comprising the glass filaments and the epoxy resin.

It will be noted from FIG. 1 that a spiral wrap of the filaments is applied along the length of the rotating mandrel from right to left. The reinforcing filaments and liquid resin which is being dispensed through the spout 18 are disposed on a reciprocally movable carriage or the like which moves back and forth along the length of the rotating mandrel on tracks or the like so as to reciprocally traverse a specific linear path.

In my earlier U.S. Pat. No. 4,138,285 of Feb. 6, 1979 and in may earlier U.S. Pat. No. 4,063,838 a pipe construction and method of forming pipes of the types contemplated by this invention are disclosed. Inasmuch as these patents are commonly owned with the subject application, the disclosures thereof are to be incorporated herein by reference.

In my earlier U.S. Pat. No. 3,879,868 of Aug. 5, 1975 also commonly owned with the subject application, a conveyor construction for applying the longitudinal strands to a pipe mandrel of formation is disclosed which facilitates and expedites the formation of the pipe contemplated by this invention. The disclosure of this patent also is to be incorporated herein by reference.

It is extremely important in the formation of the pipe noted, such as pipe 10 of FIG. 1, that there be no void or "dry spot" in the filmentous body as such dry spot results in the leakage or "weeping" when liquids pass through such pipe under pressure. Continued pressure application to such dry spots ultimately results in cracking or fracture and eventual failure of the pipe. Accordingly pipe to be produced in accordance with this invention is intended to be void-free. Such condition is assured by having the flamentous reinforcements, both longitudinal and spiral, completely wetted at the time of or shortly following application to the mandrel so that upon final curing of the pipe at a desired curing temperature no voids are present and a desired body free of voids and dry spots is assured.

One of the more significant costs of the produced pipe is the expense of the resin component. A preferred hardenable composition comprising triethylene, tetramine and epoxy resin while producing a cured pipe of excellent strength and chemical resistance has a limited fluid working life. Thus it will be noted from FIG. 1 that the resin and hardener are dispensed at the time the spiral wrap 16 is applied to the rotating mandrel. The hardener and resin are mixed in the vicinity of the spout 18 so that at the time of application to the rotating mandrel the mixture has been freshly formed.

It is also known that this composition of short working life may only be recycled into the process of the pipe formation if the resin hardener composition dripping from a mandrel is caught immediately and quickly returned for application to the filament reinforcements.

It is an object of this invention to provide a novel trowel construction which is ideally suited for use in the formation of pipe of the type 10 illustrated in FIG. 1. It is the function of the provided trowel to be disposed beneath the resin hardener composition at the time of application to the rotating mandrel so as to minimize the amount of liquid composition dripping from the rotating mandrel and partially formed pipe. The trowel bottom enables resin re-engagement with and reapplication to the periphery of the rotating mandrel filaments as the trowel such as trowel assembly 20 of FIGS. 2 through 6 moves along the length of the rotating mandrel. The trowel assembly 20 comprises a trough portion 22 which may be formed by cutting a pipe member diametrically along the length thereof whereafter a desired trough length is in turn cut from the pipe half of semicircular sectional configuration.

In accordance with this invention, a trough length of slightly in excess of one foot has been found to function satisfactorily. Extending from one longitudinal edge of the trough 22 is a connecting plate 24 which is secured to such edge at 25 by welding or the like. The plane of the plate 24 preferably coincides with the common plane of the opposed longitudinal edges of the trough portion 22 as is most apparent from FIG. 4 of the drawing. The trough 22 and plate 24 may be formed from a single metal plate which is appropriately cut and formed.

Figure 6:
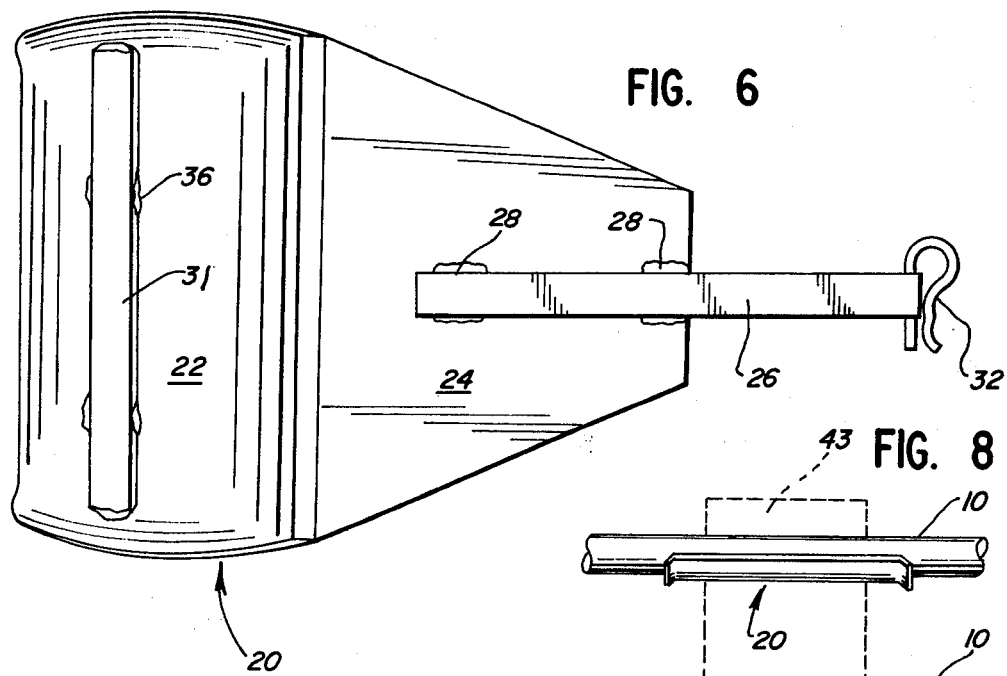
FIG. 6 is a bottom plan view of the trowel of FIG. 5.

Secured to the rear of the plate 24 of the illustrated trowel assembly 20, as is most apparent from FIG. 6 is a support bar 26 which is welded at 28 or otherwise suitably affixed to the plate 24 of the trowel assembly 20. The end of the support bar 26 may be apertured at 30 as will be seen from FIG. 5 for reception of a retention pin 32, the function of which will become more apparent hereinafter.

Figure 7:
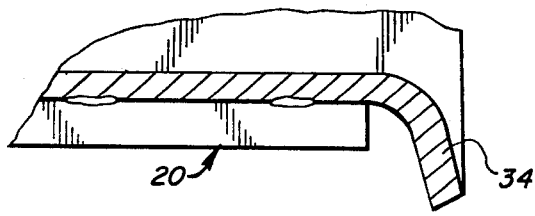
FIG. 7 is a fragmentary sectional view taken on line 7—7 of FIG. 5.

An important structural feature of the trowel assembly 20 comprises the depending lip portions 34 defining the opposed longitudinal ends of the trowel trough portion 22. As will be more clearly seen from FIG. 7, the lip portions 34 comprise opposed longitudinal end edges of the trough which are flared downwardly as illustrated.

Secured to the underside of the trowel trough 22 is a wear strap 34 which may be secured by welds 36 or the like to the underside of the trough as illustrated in FIG. 6.

The support bar 26 of the wiper assembly is slidably received in an opening of a pivotal mount 38 more clearly seen in FIG. 4 which is pivoted at 40 to a base member 42 securely mounted on a reciprocally movable carriage 43 fragmentarily illustrated which moves along the length of the pipe members formed such as pipe 10 in FIG. 1. Extending from the supporting carriage are spaced, diverging spring steel supports 46 illustrated in side elevation in FIG. 4 and in phantom line in FIG. 3. It is the function of these spring steel supports to apply an upward bias to the trowel assembly 20 by engaging the wear strap 34 at opposed ends thereof in the manner of FIG. 3.

As a result, the provided trowel assembly 20 may follow exactly the contour and movement of the rotating mandrel and partially formed pipe thereon as the trowel assembly moves with the carriage on which disposed along the length of the pipe being formed. The provided trowel assembly may have the trough portion 22 thereof move in and out relative to the linearly moving carriage on which mounted by virtue of the sliding engagement between the support bar 26 and the receiving mount 38. The retention pin 32 prevents the bar 26 and trowel assembly 20 from becoming disengaged from the mount 38 by sliding outwardly away from the trolley when the mandrel and pipe are removed from disengagement with the trowel assembly following pipe completion. In the course of pipe formation the mandrel or mandrel-pipe interfit with the trough portion 22 of the trowel assembly 20 assures a continuous interfit which retains the mandrel and pipe portion formed thereon in engagement with the trough 22. Thus it is apparent that the trowel assembly may move in and out relative to the pivotal mount 38 as illustrated in FIG. 4 and, in addition, may rock in the vertical plane as illustrated by the dotted line positions of the trowel trough in FIG. 4 because of the spaced spring steel supports 46.

It is thus apparent that in the event the mandrel 11 about which the pipe 10 is formed is not straight or provides an enlarged orbit of rotation at the center thereof which center is spaced the maximum distance from the opposed supporting bearing-engagement ends, the trowel trough will be able to rock in the vertical plane as well as reciprocally move in an in and out direction as illustrated in FIG. 4.

In the normal course of pipe formation after application of the longitudinal filaments 12 and tying down of the same by means of the tie-down helices 14 to prevent "flyout" during mandrel rotation, the carriage 43 will make a double pass along the length of the longitudinal reinforcements dispensing a resin-hardener composition over the mandrel and onto the longitudinal filaments. Any excess resin which is dispensed and not retained by the filaments falls to the bottom of the trough portion 22 of the trowel assembly 20. As the trowel assembly moves longitudinally with the carriage along the length of the pipe, the resin in the bottom of trough 22 is smoothed or troweled onto the surface of the rotating pipe, ensuring complete saturation of the longitudinal filaments. After the desired saturation of longitudinal filaments, the carriage begins a spiral wrap sequence by means of the filaments 16 passing through guide plates 50 and/or guide pins 52 after traversing tensioning rolls 54 which enable the filament reinforcements 16 to be pulled onto the periphery of the partially completed rotating pipe member 10 of FIG. 1 with a desired resistance so that the desired filament tension may be present in the spirally wrapped filaments 16.

To prevent a cutting action as a result of the filaments passing over the junction between the plate 24 and trough 22, of the trowel assembly 20, a rod 56 is present at such junction. The round rod surface assures the absence of any cutting action on the filaments 16 as they proceed about the bottom periphery of the rotating mandrel and partially formed pipe, and are pulled onto the periphery of the partially formed pipe. As the carriage moves along the length of the rotating mandrel and pipe assembly, the opposed depending lips or edges 34 of the trough portion 22 of the trowel assembly effect a wiping or smoothing action of the resin onto the periphery of the partially formed pipe. The absence of any cutting action of the trowel assembly on the pipe is thus assured and a smooth sliding engagement of the trowel assembly of the pipe periphery is also assured regardless of the manner in which the trough member is rocked or moved by the rotating mandrel and partially formed pipe. No portion of the trough assembly is able to effect a deleterious contact with the filaments present on the surface of the rotating, partially formed pipe. Longitudinal edge 58 of the trough portion 22 of the trowel assembly 20 may be bent or slightly flared outwardly as at 35 in FIG. 4 to insure the absence of any possibility of a cutting action taking place between such distal edge and the filaments of the rotating pipe disposed within the trough portion 22.

By the controlled dispensing of the precise amount of resin hardener composition at a rate which assures wetting of the filaments, the speed of the carriage and trowel along the length of the rotating mandrel in the course of pipe formation may be controlled so that there is a minimum of wastage or dripping of the fluid resin hardener composition from the ends of the trowel assembly trough. Resin hardener wastage is reduced to a desired minimum by the use of the provided trowel assembly. Any excess resin not formed into the interstices of the filament reinforcements moves into the bottom of the trough whereafter the longitudinal movement of the trough and trowel assembly forms an exterior glaze or outer resin surface as the pipe rotates in a slight excess of resin disposed in the bottom of the trough. The opposed flared end edges 34 assures the absence of a cutting engagement with the filaments regardless of the axial direction of movement of the carriage and trowel assembly along the length of the partially formed pipe, and regardless of the axis or orbit of rotation of the mandrel segment disposed in the trough assembly trough.

Figure 8:
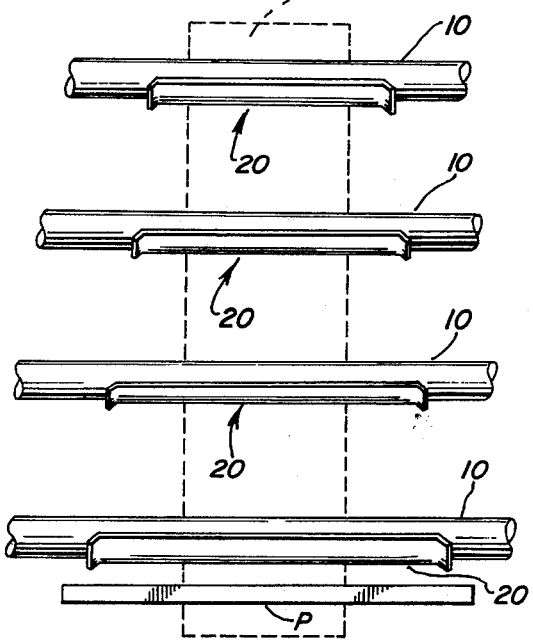
FIG. 8 is a fragmentary, schematic, elevational view of a plurality of piper members being made simultaneously and employing trowels of increasing length.

Fiber reinforced resin pipe of the type disclosed herein is commonly made on apparatus in which a batch of superposed pipe members (e.g., five) are simultaneously formed, see my earlier U.S. Pat. No. 3,897,869. Accordingly, to further minimize resin wastage the trough portions 22 of the assemblies 20 which are also in superposed relation as mounted on a movable carriage, increase in length from top to bottom as illustrated schematically in FIG. 8. As a result, any resin hardener spillage from the ends of an overlying trough 20 falls on an underlying pipe portion disposed in a larger, underlying trough. The progressive increase in trough length may be of the order of six inches although any desired workable increment in length may be employed to prevent waste-forming spillage from the trowels disposed above the lowermost trowel to the underlying ground. A collection pan such as pan P may be disposed beneath the largest, lowermost trowel for periodic emptying and recycling of resin hardener into the resin hardener system, or emptying into the uppermost trough 22 or onto the center portion of the pipe segment disposed therein.

It is thus seen that the provided trowel is extremely simple in construction and has substantially universal movement so as to desirably follow the contour of the mandrel and pipe segment disposed within the trough 22. The upward bias given to the trowel trough 22 by the spring steel supports acting against the wear strap 34 assures substantially continuous contact of the trough bottom and a trough sidewall portion with the periphery of the partially formed pipe at all times.

Although the provided structure is above seen to be simple, it nevertheless provides exceptional benefits by substantially eliminating resin wastage and assuring the absence of dry spots in the formed pipe. The provided trowel assembly assures constant contact with the pipe being formed regardless of the wobble or other imperfection and rotational orbit that the mandrel may follow in the course of pipe formation. The provided trowel assembly may be readily disengaged from the carriage by removing the retaining pin 32 and disengaging bar 26 from mount 38.

Although the foregoing description has been specific with reference to the formation of pipe preferably formed of a glass-filament reinforced epoxy resin composition, it is obvious that the provided wiper may be used to advantage in the formation of fittings or other bodies formed of similar compositions such as wire or carbon filament reinforcements formed in a matrix of other wellknown resin compositions. It is believed that the foregoing has made apparent a number of structural modifications which can be made in the disclosed apparatus and which remain within the ambit of the broad invention disclosed. This invention, therefore, is to be limited only by the scope of the appended claims.

What is claimed is:

1. In a method for simultaneously forming a plurality of filament-reinforced, resin tubular members about a plurality of substantially superposed, rotatable mandrels of formation, the steps comprising applying longitudinal, parallel reinforcing filaments about the periphery of each of such mandrels; mixing a hardenable resin-hardener liquid composition; dispensing liquid resin-hardener composition along the length of each of the rotatable mandrels as such mandrels rotate whereby such liquid is dispensed along a spiral path about said mandrel periphery onto said filaments; receiving a peripheral portion of a segment of each of said mandrels located beneath the point of resin dispensing in a concave trowel; locating said trowels associated with said mandrels in superposed relation with said trowels being of increasing length from top to bottom whereby spillage of resin hardener liquid from the ends of the upper trowels drops over an underlying trowel for collection by such underlying trowel; resiliently mounting each of said trowels against the filaments on said mandrels whereby said trowels may move with the engaged peripheries of the filament-covered mandrels and maintain constant contact thereagainst; and wiping the resin into the interstices of said longitudinal filaments by means of said trowels.

2. The method of claim 1 in combination with the step of collecting liquid resin-hardener composition spilling from the opposed ends of the lowermost trowel by an underlying collection means and recycling the same.

3. The method of claim 1 in which the method comprising the steps thereof are alternated with the method comprising the steps of applying spiral windings of filament reinforcements substantially transversely to the longitudinal filaments; dispensing hardenable resin-hardener liquid composition onto such filaments at the time of spiral filament application to said mandrel; and wiping excess resin-hardener flowing from said spiral filaments into the concave trowels about the spiral filaments and into the interstices thereof.

4. The method of claim 3 in which the resin hardener liquid composition is dispensed along the length of said parallel filaments twice prior to application of said spiral filaments.

5. Apparatus for simultaneously forming a plurality of filament-reinforced tubular members about a plurality of rotating pipe forming mandrels comprising means associated with each mandrel for wrapping layers of reinforcing filaments saturated with a liquid, hardenable resin along the length of such each mandrel; trowel means for troweling resin for saturating said filaments into the filament intersticies associated with each mandrel; each of said trowel means comprising an open channel of substantially uniform semicircular cross-section; said cross-section being of such size as to receive successive segments of an associated rotating mandrel therein in a loose fit; resilient means for biasing said trowel means upwardly against the rotating mandrel with which associated; reciprocally movable support means on which each of said trowel means is mounted and with which said trowel means is reciprocally movable along the length of such associated mandrel; and means for mounting each of such trowel means on said reciprocally movable support means; said biasing means providing continuous contact between an associated mandrel and each of said trowel means during movement of said trowel means relative to such mandrels; such mandrels and associated trowel means being in substantially vertical alignment; the lengths of said trowel means increasing in length from top to bottom whereby resin spillage from trowel means disposed above the lowermost trowel is received over an underlying trowel means.

6. The apparatus of claim 5 in which said trowel means has opposed longitudinal end edges flared away from the trowel interior.

7. The apparatus of claim 5 in which said trowel means has a semicircular cross-section; said cross-section being of a size to receive the maximum diameter of the formed pipe on such mandrel in a loose fit, and encompassing approximately one-half of such pipe periphery.

8. The apparatus of claim 5 in which said biasing means of said trowel means allows trowel means movement in the vertical and horizontal plane for purposes of maintaining continuous contact with such rotatable mandrel in the course of moving along the length thereof.

9. The apparatus of claim 5 in which said trowel means has a distal longitudinal edge flared away from the mandrel-receiving interior thereof.

10. The apparatus of claim 5 in which said trowel means includes a trough-like portion in which said successive segments of the rotatable mandrel are received and has opposed parallel longitudinal edges; one of said edges being secured to a plate portion extending therefrom in substantial parallel relation with said edges; the juncture between said longitudinal one edge and said plate being defined by a rounded surface.

11. The apparatus of claim 10 in which the rounded surface comprises a rod disposed at the juncture between said plate and said trough-like portion.

* * * * *